(12) United States Patent
Straub

(10) Patent No.: US 12,456,054 B2
(45) Date of Patent: Oct. 28, 2025

(54) GRADIENT DESCENT TRAINING FOR DEFENSIBLE ARTIFICIAL INTELLIGENCE

(71) Applicant: NDSU Research Foundation, Fargo, ND (US)

(72) Inventor: Jeremy Straub, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 804 days.

(21) Appl. No.: 17/688,659

(22) Filed: Mar. 7, 2022

(65) Prior Publication Data
US 2023/0281452 A1    Sep. 7, 2023

(51) Int. Cl.
*G06N 3/082*    (2023.01)
*G06N 3/048*    (2023.01)

(52) U.S. Cl.
CPC ............ *G06N 3/082* (2013.01); *G06N 3/048* (2023.01)

(58) Field of Classification Search
CPC ........ G06N 5/045; G06N 5/025; G06N 3/082; G06N 3/048; G06N 3/042; G06N 3/09; G06N 3/084
See application file for complete search history.

(56) References Cited

U.S. PATENT DOCUMENTS

| | | | | |
|---|---|---|---|---|
| 5,396,580 A | * | 3/1995 | Fu | G06N 3/042 706/45 |
| 2016/0379119 A1 | * | 12/2016 | Kumar | G06F 11/008 706/46 |
| 2022/0269983 A1 | * | 8/2022 | Zhang | G06N 20/00 |
| 2023/0214724 A1 | * | 7/2023 | Kotriwala | G06N 5/045 706/12 |

OTHER PUBLICATIONS

Zhou, Zhi-Jie, et al. "A survey of belief rule-base expert system." IEEE Transactions on Systems, Man, and Cybernetics: Systems 51.8 (2019): 4944-4958. (Year: 2019).*

(Continued)

*Primary Examiner* — Andrew T Chiusano
(74) *Attorney, Agent, or Firm* — Schwegman Lundberg & Woessner, P.A.

(57) ABSTRACT

Defensible AI systems and methods may provide technical solutions for technical problems facing typical AI systems. An expert system may be used to address problems facing AI that systems operate without providing visibility into their internal decision-making processes. The expert system may be developed with meaning-assigned fact nodes. A gradient descent style training process may be used to improve the performance of expert system networks. In an example, a gradient descent training process identifies the contributions of rules and fact values to the outcome fact values, then distributes a portion (e.g., velocity value determined portion) of the error to each rule input weighting based on its proportion of overall contribution. These expert systems may use various approaches to training, such as various selected inputs used to calculate the difference value (e.g., error value), various network designs, various error and augmentation levels, and various different training levels.

14 Claims, 10 Drawing Sheets

(56) References Cited

OTHER PUBLICATIONS

Augasta, M. Gethsiyal, and Thangairulappan Kathirvalavakumar. "Reverse engineering the neural networks for rule extraction in classification problems." Neural processing letters 35 (2012): 131-150. (Year: 2012).*
Straub, Jeremy. "Machine learning performance validation and training using a 'perfect' expert system." MethodsX 8 (2021): 101477. (Year: 2021).*
Straub, Jeremy. "Expert system gradient descent style training: Development of a defensible artificial intelligence technique." Knowledge-Based Systems 228 (2021): 107275. (Year: 2021).*
Zhang, Yong, et al. "Combining expert weights for online portfolio selection based on the gradient descent algorithm." Knowledge-Based Systems 234 (2021): 107533. (Year: 2021).*
Dattachaudhuri, Abhinaba, et al. "A transparent rule-based expert system using neural network." Soft Computing 25.12 (2021): 7731-7744. (Year: 2021).*
Augasta, M. Gethsiyal, et al., "Pruning algorithms of neural networks a comparative study", Open Comput. Sci. 3, [Online]. Retrieved from the Internet: <URL: https://doi.org/10.2478/S13537-013-0109-X>, (2013), 105-115.
Barbara, Hayes-Roth, "A blackboard architecture for control", Artif. Intell. 26, (1985), 251-321.
Blalock, Davis, et al., "What is the State of Neural Network Pruning", [Online]. Retrieved from the Internet: <URL: https://arxiv.org/abs/2003.03033v1>, (accessed Sep. 1, 2021), (2020), 18 pgs.
Fung, Glenn, et al., "Rule extraction from linear support vector machines", In: Proc. ACM SIGKDD Int. Conf. Knowl. Discov. Data Min., ACM Press, New York, New York, USA, [Online]. Retrieved from the Internet: <URL: https://doi.org/10.1145/1081870.1081878>, (2005), pp. 32-40.
Hewahi, Nabil M, "Neural network pruning based on input importance", J. Intell. Fuzzy Syst. 37, [Online]. Retrieved from the Internet: <URL: https://doi.org/10.3233/JIFS-182544>, (2019), 10 pages.
Palade, Vasile, et al., "Interpretation of Trained Neural Networks by Rule Extraction", in: Lect. Notes Comput. Sci. Springer Verlag, [Online]. Retrieved from the Internet: <URL: https://doi.org/10.1007/3-540-45493-4_20>, (2001), 11 pages.
Qian, Xin, et al., "A Probabilistic Approach to Neural Network Pruning", [Online]. Retrieved from the Internet: <URL: https://arxiv.org/abs/2105.10065v1>, (accessed Sep. 1, 2021), (2021), 29 pgs.
Reed, Russell, "Pruning Algorithms A Survey", IEEE Trans. Neural Networks. 4, [Online]. Retrieved from the Internet: <URL: https://doi.org/10.1109/72.248452>, (1993), 740-747.
Setiono, Rudy, "Understanding neural networks via rule extraction", in: Proc. 14th Int. Jt. Conf. Artif. Intell., Morgan Kaufmann Publishers Inc., [Online]. Retrieved from the Internet: <URL: https://dl.acm.org/doi/abs/10.5555/1625855.1625918> (accessed Apr. 27, 2021), (Aug. 20, 1995), 6 pages.
Straub, J., "Assessment of Gradient Descent Trained Rule Fact Network Expert System Multi Path Training Technique Performance", Computers 2021, 10(8), 103, [Online]. Retrieved from the Internet: <URL: https://doi.org/10.3390/COMPUTERS10080103>, (2021), 1-25.
Straub, J., "Automating maintenance for a one way transmitting blackboard system used for autonomous multi tier control", Expert Syst., [Online]. Retrieved from the Internet: <URL: https://doi.org/10.1111/exsy.12162>, (2016), 13 pages.
Straub, J., "Comparing the Effect of Pruning on a Best Path and Naive Approach Blackboard Solver", Int. J. Autom. Comput. 12.5, (2015), 503-510.
Straub, J., "Impact of techniques to reduce error in high error rule based expert system gradient descent networks", J. Intell. Inf. Syst. 2021, [Online]. Retrieved from the Internet: <URL: https://doi.org/10.1007/S10844-021-00672-7>, (2021), 32 pages.
Straub, J., "Machine learning performance validation and training using a perfect expert system", MethodsX. 8, 101477, [Online]. Retrieved from the Internet: <URL: https://doi.org/10.1016/J.MEX.2021.101477>, (2021), 6 pages.
Straub, Jeremy, "Expert system gradient descent style training Development of a defensible artificial intelligence technique", Knowledge-Based Systems 228, (2021), 24 pgs.
Wang, Huan, et al., "Emerging Paradigms of Neural Network Pruning", [Online]. Retrieved from the Internet: <URL: https://arxiv.org/abs/2103.06460v1>, (accessed Sep. 1, 2021)., (2021), 8 pgs.
Xu, S., et al., "Convolutional Neural Network Pruning A Survey", Control Conf. CCC., [Online]. Retrieved from the Internet: <URL: https://doi.org/10.23919/CCC50068.2020.9189610>, (Jul. 2020), 6 pages.
Yeom, Seul-Ki, et al., "Pruning by explaining A novel criterion for deep neural network pruning", Pattern Recognit. 115, 107899, [Online]. Retrieved from the Internet: <URL: https://doi.org/10.1016/J.PATCOG.2021.107899>, (2021), 14 pgs.

* cited by examiner

GRADIENT DESCENT TRAINING FOR DEFENSIBLE ARTIFICIAL INTELLIGENCE

BACKGROUND

Artificial intelligence (AI) systems, which are designed with a capability to learn from the data presented to them, are used throughout society. In various examples, these AI systems are used to screen loan applicants, make sentencing recommendations for criminal defendants, scan social media posts for disallowed content, identify mental health issues, make medical recommendations, and more. Many AI systems are designed with a capability to learn from data presented to them as part of a supervised training process, semi-supervised training process, or unsupervised training process. Through this learning process, the algorithm makes associations between input data and output results, thus identifying characteristics of inputs that are associated with characteristics of outputs.

However, these AI systems operate without providing visibility into their internal decision-making processes (e.g., do not assign human-readable meanings to their complex learned correlation network). These AI systems may learn invalid relationships due to limited, skewed, or erroneous training data. Problematically, many of these techniques cannot be readily understood by humans in order to verify that they are making decisions in the ways expected. In some cases, the decisions they make cannot be otherwise evaluated to ensure that they are valid or optimal. Perhaps most problematically, systems will work well in most cases, but fail in cases where certain key assumptions fail. Systems that are not human understandable or reviewable risk catastrophic failures, which could harm humans by causing them to be incorrectly assessed (e.g., job application, bank loan application), or putting them at risk of injury or death caused by an autonomously controlled robotic system.

These AI systems may also learn non-causal associations, which may result in non-optimal and indefensible decisions being made. In addition to making decisions that are suboptimal, these systems may create legal liability for their designers and operators by learning correlations that violate anti-discrimination and other laws regarding what factors can be used in different types of decision-making. Decisions based on AI systems may reinforce patterns of discrimination, income inequality, and other societal inequities. AI decision systems and other autonomous data analysis systems may follow traditional power structures, based on the data that they learn from, thereby further disenfranchising the historically disenfranchised. These AI systems may inadvertently become discriminatory instruments, and may lead to civil liability. The potential for improperly informed or biased decisions, without the AI system or its developers even being aware that the AI system is doing so, further contribute to public concern about the use of AI systems.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
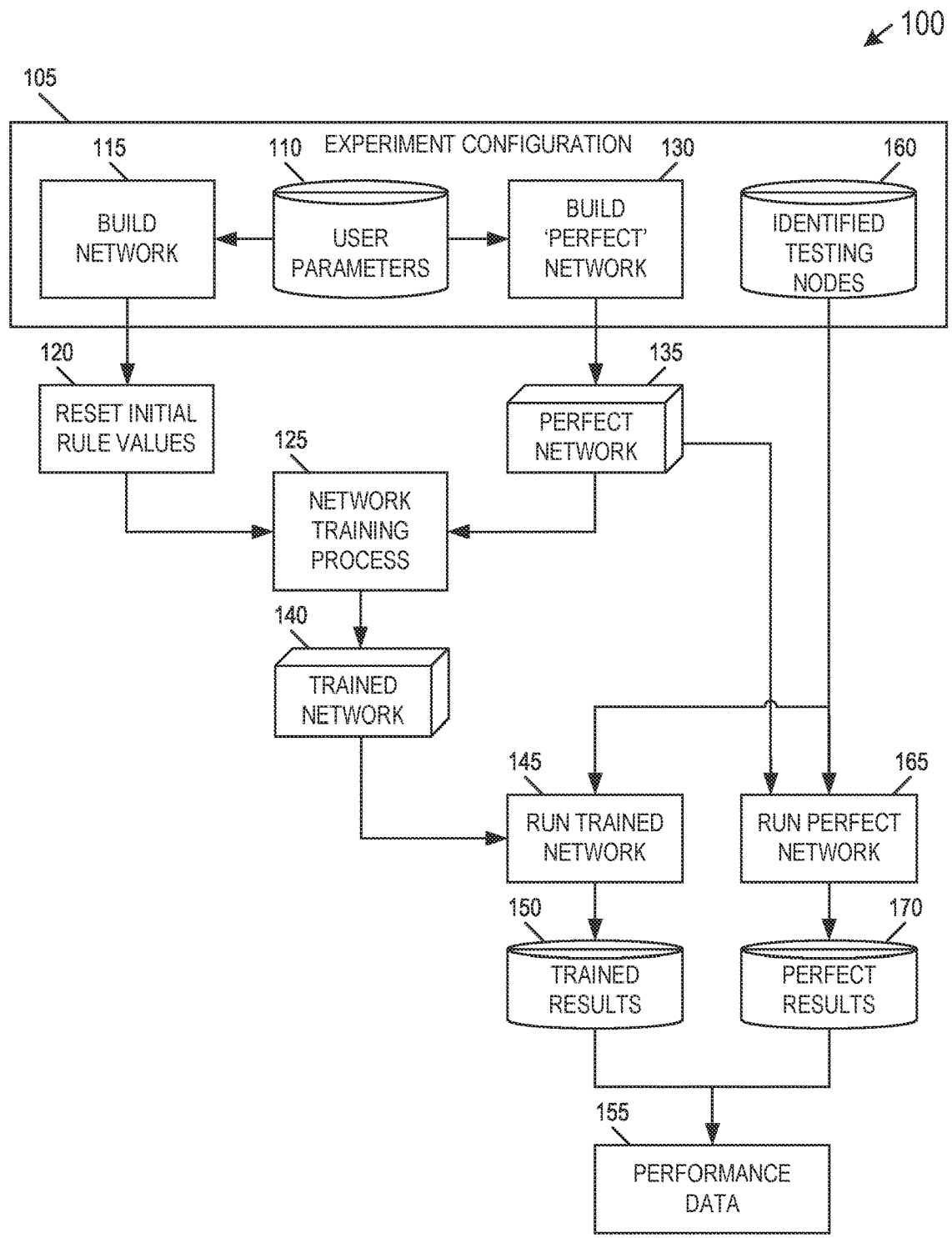
FIG. 1 is a of a system operation block diagram 100, according to an embodiment.

The defensible AI systems and methods described herein provide technical solutions for technical problems facing typical AI systems. An expert system may be used to address problems facing AI that systems operate without providing visibility into their internal decision-making processes. The expert system may be developed with meaning-assigned fact nodes. In an example, a medical expert system may use correlation rules to define associations between medical input facts (e.g., symptoms and test results) and medical output facts (e.g., diseases indicate by those symptoms and test results). The optimization of decision making in such an expert system may be performed using machine learning techniques. These expert systems can be trained effectively for optimization purposes in a manner similar to neural networks. The network structure itself may contribute significantly to system performance, which can then be enhanced further through a training process.

A gradient descent style training process may be used to improve the performance of expert system networks. In an example, a gradient descent training process identifies the contributions of rules and fact values to the outcome fact values, then distributes a portion (e.g., velocity value determined portion) of the error to each rule input weighting based on its proportion of overall contribution. These expert systems may use various approaches to training, such as various selected inputs used to calculate the difference value (e.g., error value), various network designs, various error and augmentation levels, and various different training levels. An expert system may be designed to support partial membership and ambiguity: instead of being true or false, expert system facts may have a probabilistic or partial membership value between 0 and 1. In such an expert system, rules are more complex than simply asserting an expert system output fact is true if one or more expert system input facts are true. Instead, rules have weighting values for the comparative effect of both input facts on the value of the output fact. These weightings may have associated values between 0 and 1 and may sum to 1.

A defensible artificial intelligence (DAI) may be used to provide autonomous decision that is transparent to humans. This provides improvements over retrofitting existing systems to explain how they work, which may obfuscate broken functionality or incorrectly explain a correct answer. The DAI may be based on a machine learning (ML) trained expert system that begins with an application-specific rule-fact network and uses gradient descent techniques to optimize the network. The DAI expert system is prevented from learning additional rule connections that could represent non-causal associations or other problematic or illegal relationships. To improve performance, a larger and denser-than-needed (e.g., larger and denser than needed for a given application area) homogonous-structure network may be used. Once initial training is performed, this DAI network may be pruned to remove low-value association rules. This DAI network may be human-evaluated and have rule (e.g., association) meanings assigned and evaluated. After further rule assignment and evaluation, this DAI network may be trained again to improve performance further.

In the following description, for purposes of explanation, numerous specific details are set forth to provide a thorough understanding of some example embodiments. It will be evident, however, to one skilled in the art that the present disclosure may be practiced without these specific details.

FIG. 1 is a of a system operation block diagram 100, according to an embodiment. Diagram 100 shows example system operations for generating and validating an expert network, such as a DAI network. Diagram 100 shows generating, training, and evaluating expert networks based on one or more experiment configurations 105. For each experiment configuration 105, user parameters 110 of an associated experimental condition are used to build an expert network 115 and a perfect network 135 for training and evaluation purposes.

These user parameters 110 may include the number of facts, rules in the network, and other parameters. The user parameters 110 may also be used in a perfect network build 130 to generate a perfect network 135 (e.g., ideal network), which is created to serve as an ideal model from which the network-under-training learns. For each experimental configuration, initial rule values (e.g., rule weighting values) are reset 120. Some experimental conditions also modify rule connections to represent discrepancies in the creation of the operational networks. In these cases, rules may be added (e.g., augmentation conditions) or altered (e.g., error conditions) from the connections indicated by the original rules. The built experiment network 115 and the perfect network 135 are used in a network training process 125 to generate a trained network 140. Once training is completed, the trained network 140 is run 145 to generate trained results 150. Similarly, the perfect network 135 may be run 165 to generated perfect results 170. The trained results 150 and the perfect results 170 may be compared to generate performance data 155 associated with that experiment configuration 105.

While this training and evaluation using a perfect network 135 may be used to confirm the functionality of a trained expert network 140, this testing and evaluation is described to provide an example of how a trained expert network 140 may be generated and validated. When a trained expert network 140 is generated and used in a real-world application, the trained expert network 140 may be generated and trained without the need for generating or comparing against a perfect network 135.

Various types of networks may be used. Two special network cases may include a fully connected network and a randomly connected network. Both of these networks may use a common number of facts and fact values. However, the facts may be interconnected by the rules differently. In the case of the fully connected network, each fact may be connected to each other fact, such that each relationship in the perfect network 135 is guaranteed to be included among other relationships in the network-under-training. In the case of the randomly connected networks, the ruleset may be regenerated completely, which is demonstrably dissimilar to the ruleset of the perfect network 135.

Various experiment configurations 105 may be defined by model and algorithm hyperparameters, and by experimental condition parameters. Model hyperparameters may include a number of facts and a number of rules. Rules and facts may be used to define both the perfect network 135 and for the built experiment network 115. Experimental hyperparameters may include a network perturbation, such as a base network, a fully connected network, a random network, an augmented network (e.g., augmented by various percentages), and error network (e.g., various percentage errors), or other perturbation parameters. Perturbations may be used to define the operational network-under-training only, and may represent changes made to this network for experimentation. The algorithm hyperparameters may include a number of training epochs, a velocity, and a training approach. The number of training epochs indicate the number of rounds of training that will be conducted. The velocity may describe a percentage of the difference between the ideal and system-under-training output that is applied to the rule weightings.

For each experiment configuration 105, the expert system may be tasked with determining the value of a target final fact. During each system run, a rule-fact network may be created randomly. The number of rules and facts are user-defined simulation parameters. When rules are created, facts are selected at random as input and output facts. Rules are checked against the existing ruleset to prevent duplication. During a run, an initial fact and final fact are randomly selected from all of the facts available in the network. The initial fact may have an initial value of 0.99 assigned, and the final fact value is recorded at the end of the run. An experimental run of multiple iterations may end when no facts are modified during a particular iteration of operations. A run may end immediately if the final fact starts with a value that satisfies run completion. At the end of a run, trained results 150 and perfect results 170 may be compared to generate performance data 155 associated with that experiment configuration 105.

Figure 2A:
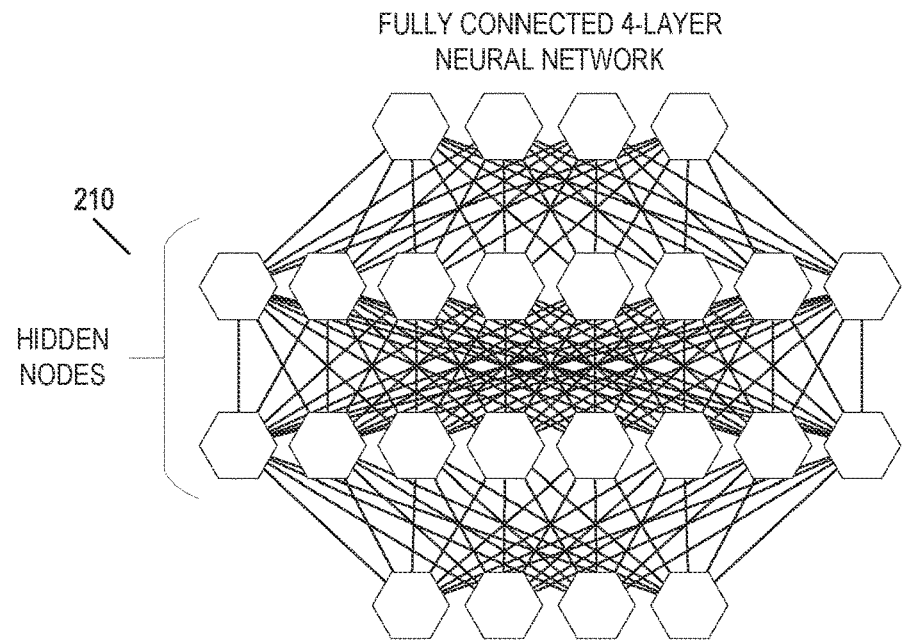
FIGS. 2A-2B are block diagrams of neural networks 200, according to an embodiment.
Figure 2B:
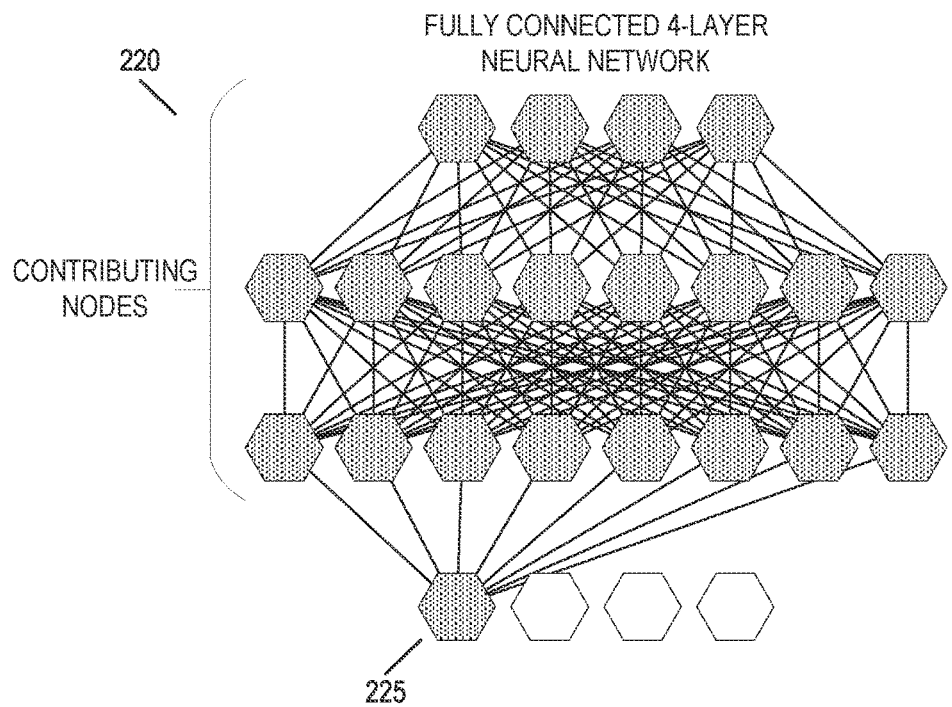

FIGS. 2A-2B are block diagrams of neural networks 200, according to an embodiment. The expert systems described herein may use an algorithm whose configuration is different from a typical neural network designed for backpropagation. FIG. 2A shows a typical, fully connected, 4-layer neural network and its interconnections, including at least two layers of hidden nodes 210. As shown in FIG. 2A, each node in a given layer is connected to all nodes in the previous and subsequent layers; however, nodes within a given layer are not connected. Additionally, each node in each layer is only connected to nodes in an adjacent layer.

As shown in FIG. 2B, all nodes in contributing node layers 220 contribute to the output if a given output node 225. An expert network may benefit from reducing or eliminating this nodal interdependency and allowing each node to be connected to any other node. However, in contrast with the fully connected neural networks 200, an expert network may include fewer connections, and may eliminated some or all node connections that do not contribute to a value of a selected target node.

Figure 3:
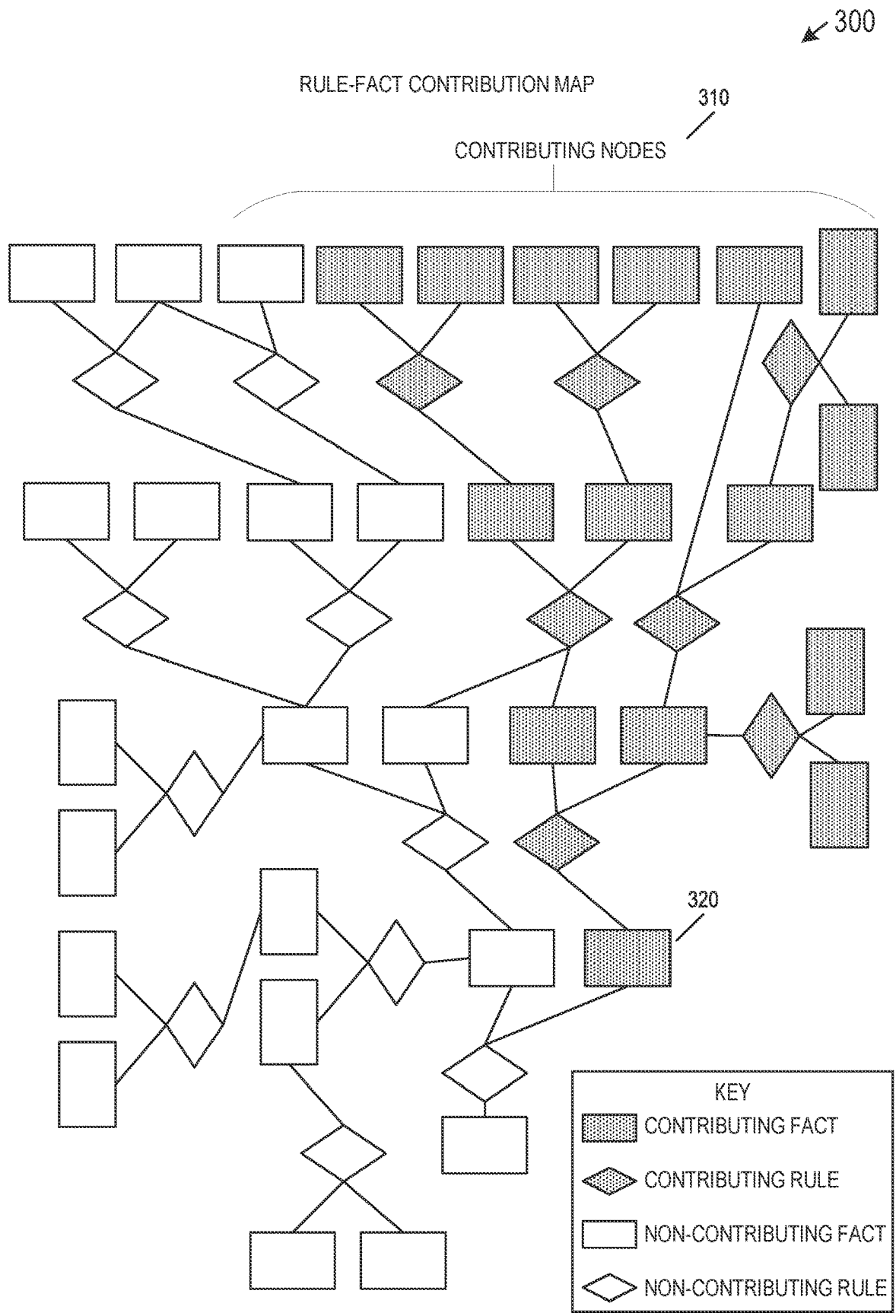
FIG. 3 is a block diagram of a rule-fact contribution map 300, according to an embodiment.

FIG. 3 is a block diagram of a rule-fact contribution map 300, according to an embodiment. Contribution map 300 shows a number of contributing nodes 310 that contribute to a target node 320. The contributing nodes 310 may include a combination of contributing facts and contributing rules. While FIG. 3 shows nodes arranged in an inverted and layered tree structure for readability, no such logical or physical organization is required with an expert system.

Figure 4:
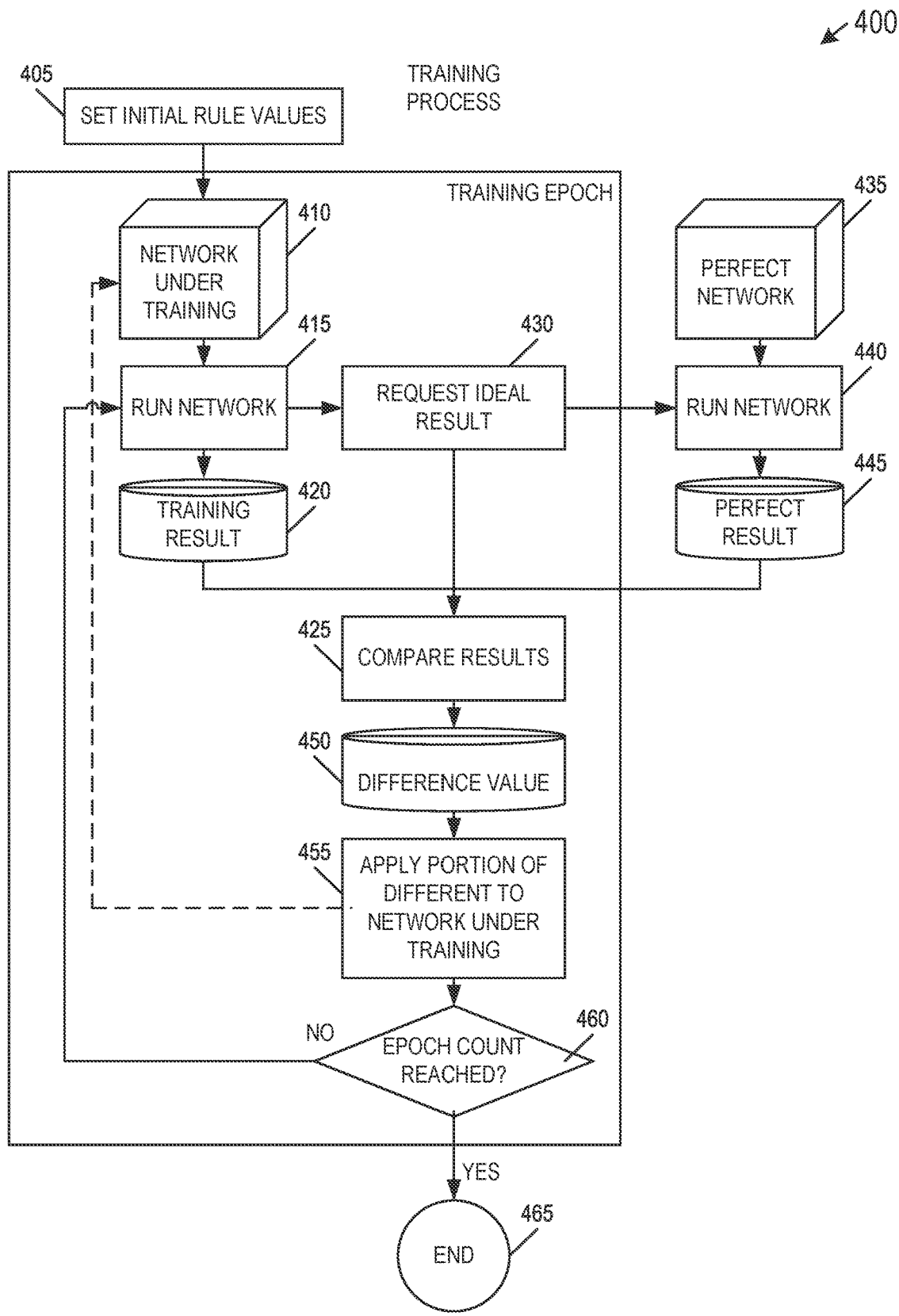
FIG. 4 is a block diagram of a training process 400, according to an embodiment.

FIG. 4 is a block diagram of a training process 400, according to an embodiment. The training process 400 may be used to generate, train, and evaluate an improved learning expert system. Training process 400 shows an improved model that identifies rules that directly or indirectly contribute to a target node. This model determines a portion of the difference between the perfect network perfect node value (e.g., ideal node value from input data used for training) and the network-under-training computed node value, then distributes that portion of the difference to the weightings of these rules. The percentage of the difference that is split between all contributing nodes may be determined by a user-configurable velocity value.

Training process 400 includes setting initial rule values 405, where the initially set rule values may be independent from the actual rule values of the perfect network. Training process 400 includes generating a network-under-training 410 and running 415 that network-under-training to generate a training result 420. Following running 415 the network-under-training, an ideal result (e.g., perfect result) may be requested 430 for comparing with the training result 420. In response to the request, a perfect network 435 may be run 440 to generate a perfect result 445. The training result 420 mand the perfect result 445 may be compared 425, which may be used to generate a difference value 450. A portion of the difference value 450 may be applied 455 back to the network-under-training 410, which distributes the difference value to each contributing node in the network. The training process is repeated until the specified number of training epochs are complete 460, at which time the training process 400 ends 465.

While this training and evaluation using a perfect network 435 may be used to confirm the functionality of a network under training 410, this testing and evaluation is described to provide an example of how a network under training 410 may be generated and validated. When a network under training 410 is generated and used in a real-world application, the network under training 410 may be generated and trained without the need for generating or comparing against a perfect network 435.

Figure 5:
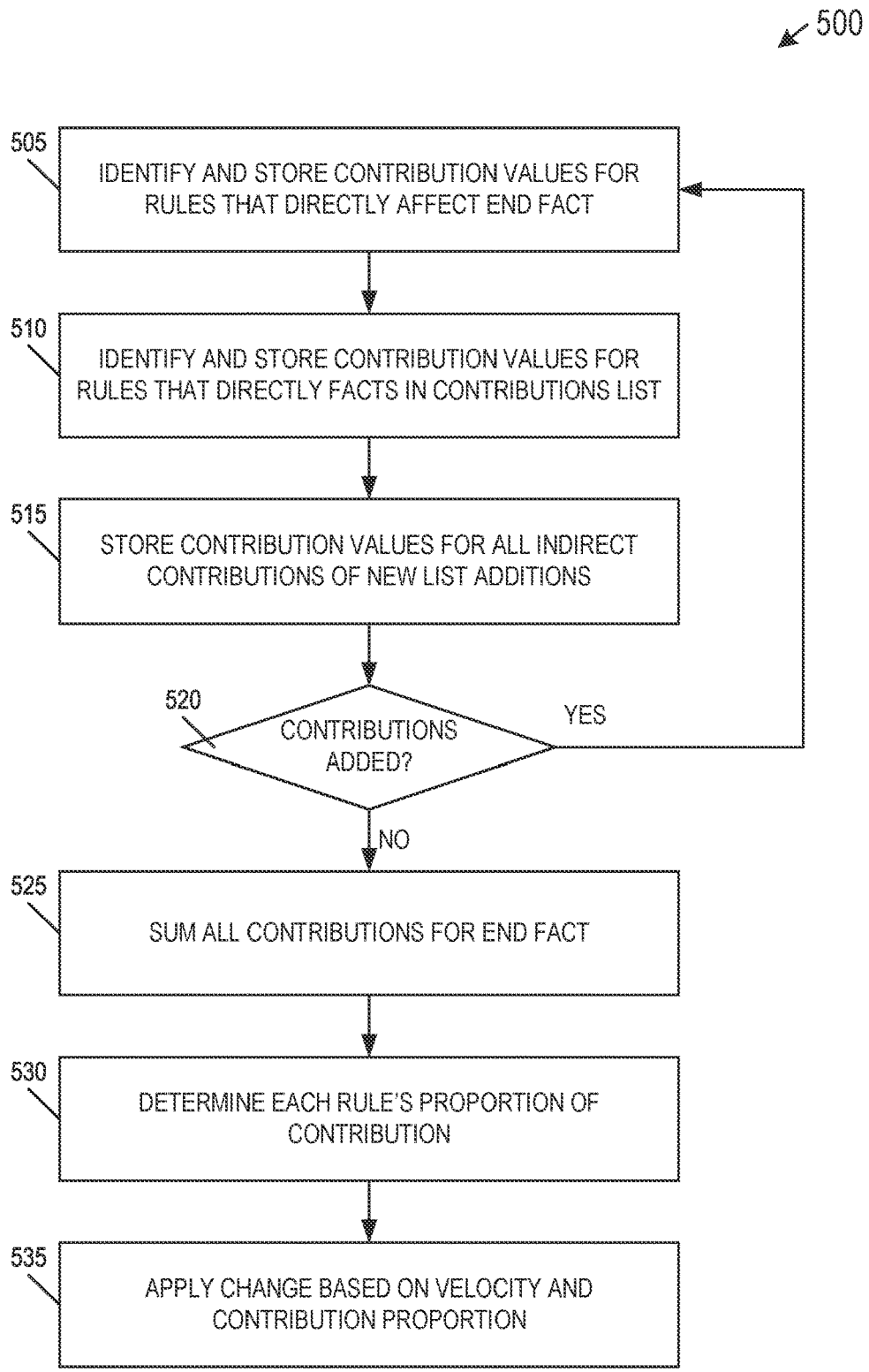
FIG. 5 is a block diagram of a node change determination method 500, according to an embodiment.

FIG. 5 is a block diagram of a node change determination method 500, according to an embodiment. Method 500 shows an example algorithm used to determine what level of change to be applied. Method 500 begins by identifying and storing 505 the contribution of each node that directly affects an end fact, which is followed by identifying and storing 510 the contribution of each node that directly affects one or more facts in a contribution list. All nodes that affect nodes that have been added to the contributions list have their indirect contributions calculated and stored 515.

The contribution of a particular rule, $C_i$, to the final fact is, thus, determined by the equation:

$$C_i = W_i \times \prod_{\{APT\}} W_{R(m,h)}$$

Wi is the applicable weighting of rule i and $W_{R(m,h)}$ is the weighting of each rule (m representing the particular rule and h indicating the applicable weight value) that the value passes through before affecting the final fact value. This set is denoted by {APT}, which represents the set of all passed through rule nodes. A given rule may have various contribution ($C_i$) values if it is part of multiple paths to the final fact. Only the highest contribution value for a particular rule is maintained by the algorithm and used for these calculations.

To determine the change made to a particular node, all contributions not affecting other intermediate nodes are excluded and all contributions that relate to the end fact are summed. The total contribution, $C_{Total}$, thus is computed by the equation:

$$C_{Total} = \sum_{\{AC\}} C_i$$

$C_i$ is the contribution of a particular rule, i, that is part of the set of all contributing rule nodes, which is denoted as {AC}.

For each newly added node, method 500 determines whether the contributions are added 520, and the previous steps 505, 510, and 515 may be repeated for each newly added node. This process of adding nodes that affect nodes on the contributions list continues until an iteration ends without additional nodes being added. When no further node contributions have been added, all contributions are summed 525 for an end fact. The proportion of contribution for each rule is then determined 530, and a change is applied 535 based on the velocity and contribution proportion. The particular node contribution level is divided by the sum of all contributions and the velocity is then applied. Thus, the difference value that is applied to a given rule weighting, Di, is calculated by dividing the contribution of the particular rule, $C_i$, by the total contribution of all rules, $C_{Total}$, and multiplying it by the velocity parameter, V, and the $\Delta_R$ value that is based on the difference between the expected and actual value for the given training run. This is computed by the equation:

$$D_i = \frac{C_i}{C_{Total}} \times V \times \Delta_R$$

The $\Delta_R$ value is calculated with the equation:

$$\Delta_R = \frac{|R_P - R_T|}{\text{MAX}(R_P, R_T)}$$

$R_P$ and $R_T$ are the perfect network result and training network result, respectively. MAX is a function that returns the largest of the values passed as an input to it.

In addition to the user-configurable velocity value setting, the number of training epochs, the network configuration type, the number of facts and rules, and the training model that are used are all user configurable. For each training epoch, the network is run in forward-mode and the contributing rules to the designated target fact are identified. The contribution of each rule is determined by multiplying rules that must pass through other rules for their effect by the percentage effect of the relevant input of the intervening rules. Once the level of error between the truth and algorithm-generated network is determined, a percentage of this error (determined by the velocity setting value) is applied to each contributing rule's weightings based on its level of contribution and the value of its facts. Depending on the change that is required to the target node value, additional or reduced weight is, appropriately, given to the higher and lower values' input facts weightings. Subsequent epochs repeat this process.

The rule-fact network performs demonstrably better than fully connected (FC) networks and random networks. The augmented and error networks also perform better than the random and FC networks, which exhibit approximately triple the error of other approaches. The FC and random networks have a much higher level of high-error runs than other network types (e.g., less than 40% in other cases), The rule-fact network structure provides significant performance improvements, while also providing improved accuracy through the rules' fact contribution weightings. In an example, an FC network may able to be readily trained to perform well, but at a much higher processing cost, and with a greater risk of becoming trapped in a local minima.

By creating these rule-fact networks using only logically valid and meaning-defined connections, the potential for the system learning an invalid correlation due to confounding relationships or data accuracy issues is reduced or eliminated. These rule-fact networks provide improved performance under a myriad of different condition combinations, such as training velocity, training epochs, and network size. These condition combinations may be selected based on specific application areas, such as identifying mental health issues or making medical recommendations.

Figure 6:
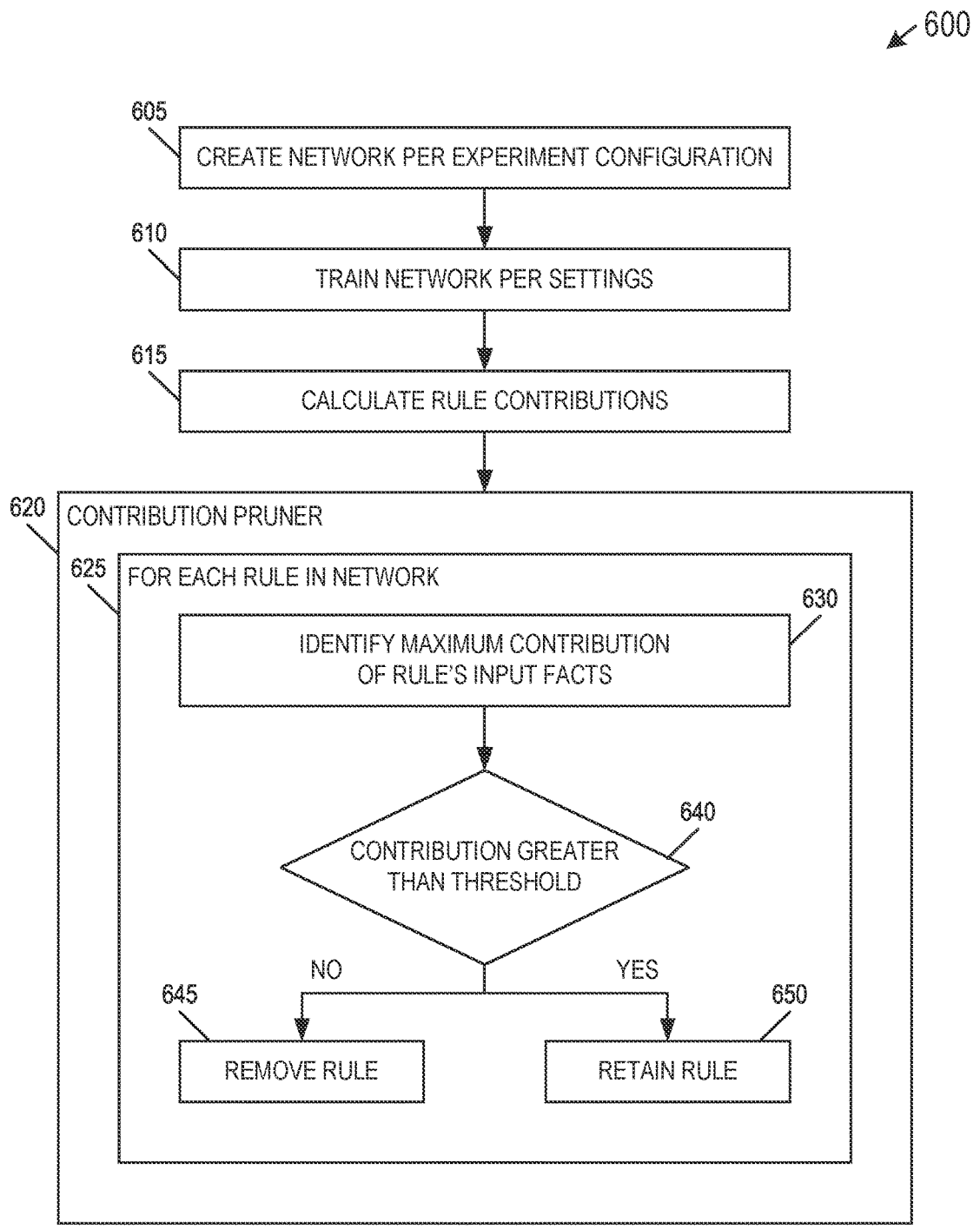
FIG. 6 is a block diagram of a contribution pruning method 600, according to an embodiment.

FIG. 6 is a block diagram of a contribution pruning method 600, according to an embodiment. Method 600 shows an example algorithm used to identify and remove one or more rules in a rule-fact network. This algorithm may be used to automate the creation of gradient descent trained expert systems by starting with a larger and denser network and pruning it down to essential elements. This pruning may generally begin with an ideal network contained within a larger network, where pruning is used to remove rules and facts that are not part of the ideal network, leaving only the ideal network remaining.

Method 600 may include creating 605 a rule-fact network based on an experiment configuration. As described above, experiment configurations may be defined by model hyperparameters, algorithm hyperparameters, and by experimental condition parameters. The creation 605 of the rule-fact network may include generation of a perfect network to confirm the functionality of the rule-fact network. However, when a rule-fact network is created 605 and used in a real-world application, the rule-fact network may be generated and trained without the need for generating or comparing against a perfect network. Following creation 605, the rule-fact network is trained 610 per network training settings. Once the network is trained, the contribution of each rule is calculated 615.

The contribution pruner 620 may operate iteratively for each rule in the network 625. For each rule, the maximum contribution of the rule to each fact is identified 630. This maximum contribution may be determined based on direct effect and indirect effect. Each maximum contribution value is then compared to a pruning threshold to determine if the value crosses (e.g., transgresses) the pruning threshold. In an example, method 600 may determine 640 when each maximum contribution value is greater than a threshold. In other examples, pruning a rule may be based on whether the maximum contribution value reaches (e.g., equals) a threshold or falls below a threshold. Based on this determination 640, the rule may be removed 645 or retained 650.

Figure 7:
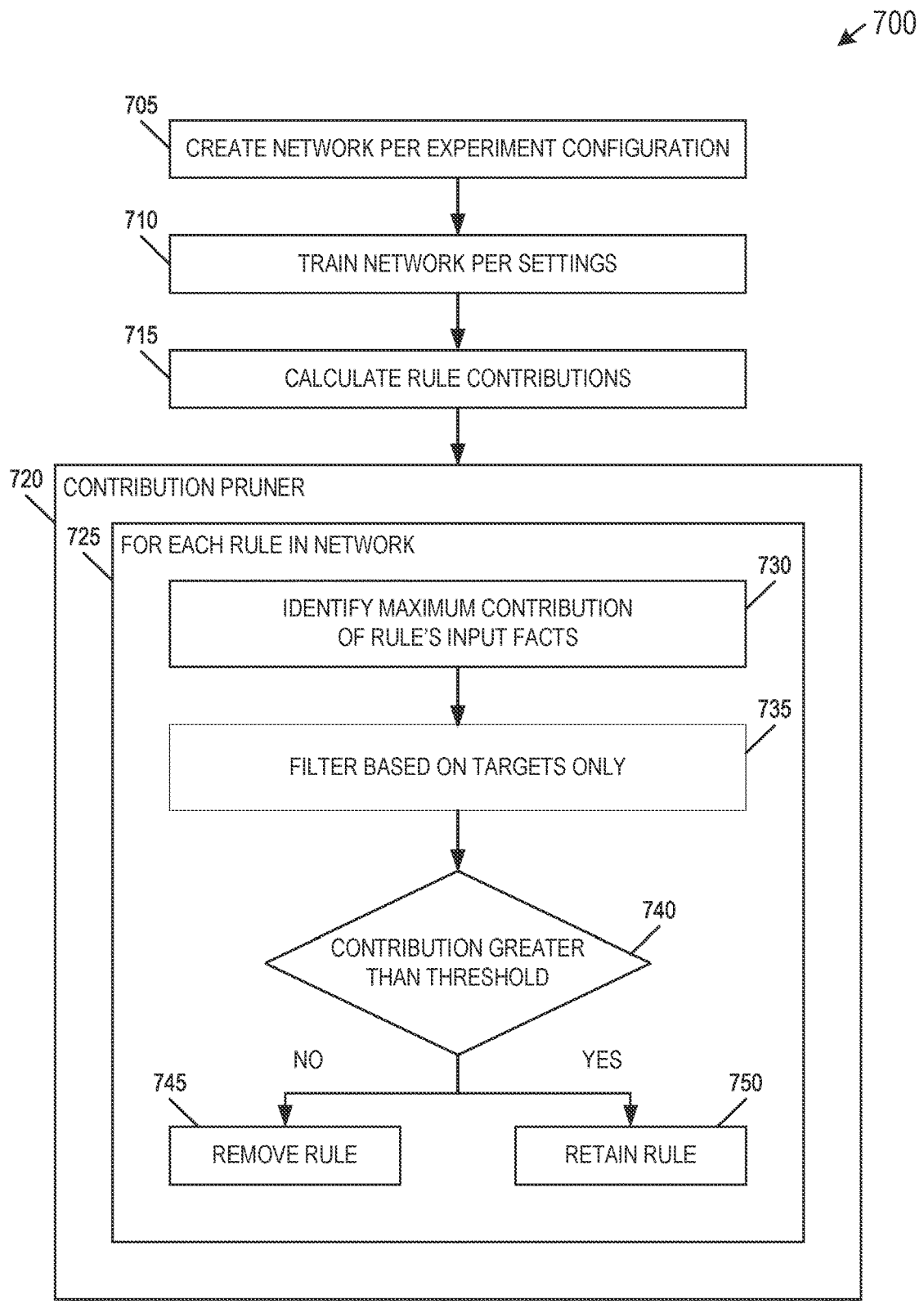
FIG. 7 is a block diagram of a contribution to target pruning method 700, according to an embodiment.

FIG. 7 is a block diagram of a contribution to target pruning method 700, according to an embodiment. Method 700 shows a target filtering algorithm used to identify and remove one or more rules in a rule-fact network. The filtering in method 700 may be used to filter (e.g., exclude) contributions to facts that are not output facts. For gradient descent trained expert systems, known outputs may be compared to real-world values for training purposes, so contributions to non-output facts are not relevant to system operations. Because the contribution values have been determined for both direct and indirect effect, rules that do not have an associated contribution value for contribution to the target output fact do not affect the target output fact and can be removed without affecting network operations. In some examples, rules that do affect a target output fact may still be pruned if their effect is limited, such as by comparison to a contribution effect threshold.

Method 700 may begin by creating 705 a rule-fact network based on an experiment configuration. The creation 705 of the rule-fact network may include generation of a perfect network to confirm the functionality of the rule-fact network. However, when a rule-fact network is created 705 and used in a real-world application, the rule-fact network may be generated and trained without the need for generating or comparing against a perfect network. Following creation 705, the rule-fact network is then trained 710 per network training settings. Once the network is trained, the contribution of each rule is calculated 715.

The contribution pruner 720 may operate iteratively for each rule in the network 725. For each rule, the maximum contribution of the rule to each fact is identified 730. The set of rules may be filtered 735 to exclude rules that do not have an associated contribution value for contribution to the target output fact. Each non-filtered maximum contribution value is then compared to a pruning threshold, such as to determine 740 when each maximum contribution value is greater than a threshold. In other examples, pruning a rule may be based on whether the maximum contribution value reaches a threshold or falls below a threshold. Based on this determination 740, the rule may be removed 745 or retained 750.

Figure 8:
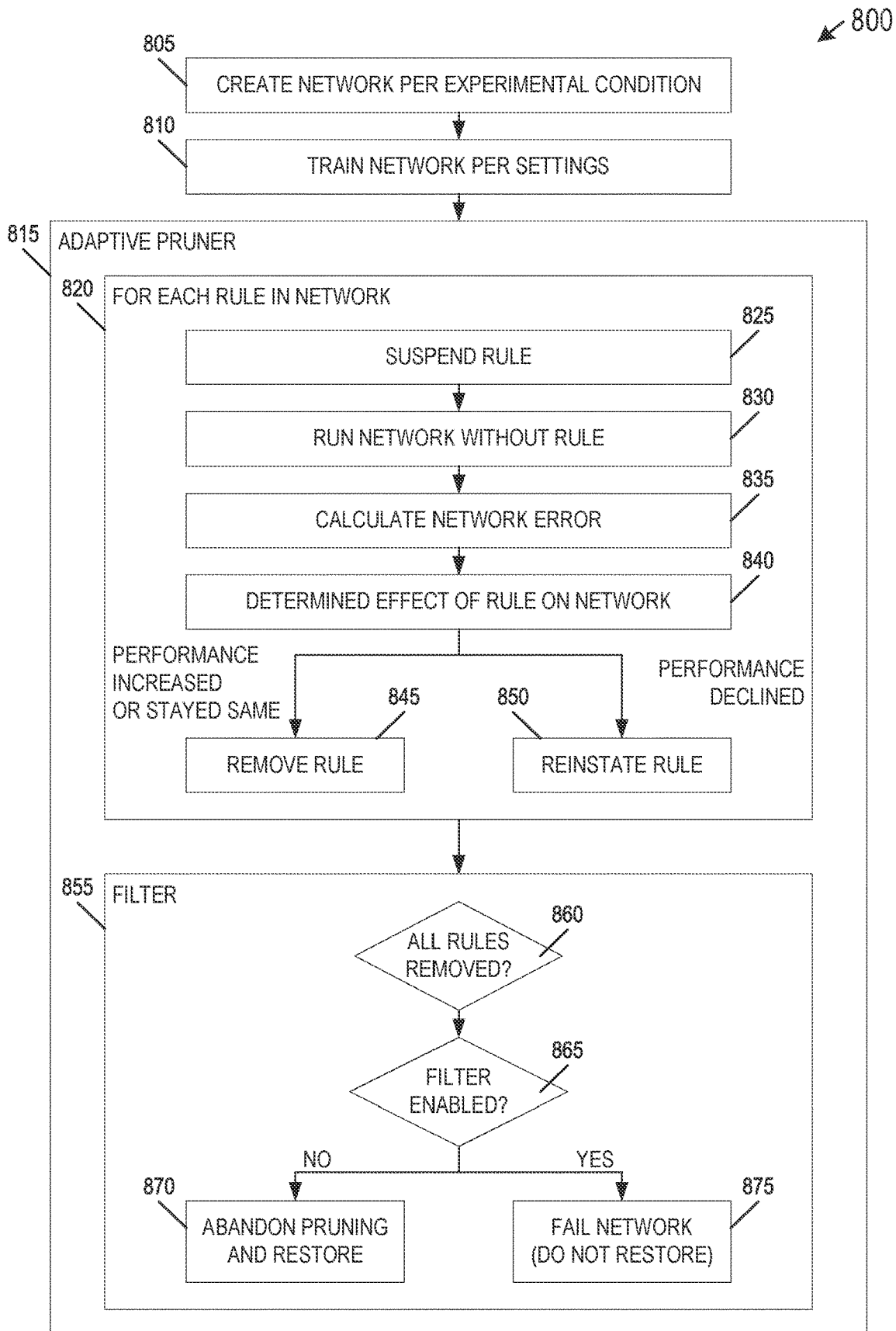
FIG. 8 is a block diagram of an adaptive pruning method 800, according to an embodiment.

FIG. 8 is a block diagram of an adaptive pruning method 800, according to an embodiment. Method 800 shows an adaptive pruning algorithm that may be used to identify and remove one or more rules in a rule-fact network and restore or fail a network based on that pruning. Method 800 may begin by creating 805 a rule-fact network based on an experiment configuration. The creation 805 of the rule-fact network may include generation of a perfect network to confirm the functionality of the rule-fact network. However, when a rule-fact network is created 805 and used in a real-world application, the rule-fact network may be generated and trained without the need for generating or comparing against a perfect network. Following creation 805, the rule-fact network is then trained 810 per network training settings.

The adaptive pruner 815 may operate iteratively for each rule in the network 820. For each rule, the rule is suspended 825, the network is run without the rule 830, a network error is calculated 835, and the effect of the rule on the network is determined 840. When the removal of the rule causes the network performance to improve or remain constant, the rule may be removed 845. When the removal of the rule causes the network performance to decline, the rule may be reinstated 850 into the network.

Method 800 may include a filter 855 to determine if a network quality is below a desired network quality. Network quality filter 855 may include determining whether all rules have been removed 860 and whether a minimum network filter has been enabled 865. The minimum network filter 865 may be used to determine whether a network should be retained after training and pruning, even if that network is of a lower quality. When the rules are all removed and there is a minimum network requirement, then pruning may be abandoned 870 and the network may be restored. When all of the rules are removed and there is no minimum network requirement, then the network may be filed 875 and network may not be restored. Once adaptive pruning method 800 is complete, any remaining network is optimized and is ready for use.

In addition to automating network creation, the pruning algorithms described herein may be used for refining human-created networks. For human created networks, pruning could be used to refine the network and reduce processing time by identifying and removing rules or facts, such as removing rules or facts that are not used, infrequently used, or are problematic. This pruning may be used to mitigate a misunderstanding about how a phenomenon works via identifying an error in the model. Pruning may also expedite processing and simplify a network model, which may make the model easier for humans to understand. In an example, rules or facts suggested for removal by the pruning process could be assessed by human reviewers to validate the appropriateness of their removal. When simplifying for human assessment, the network and pruning may be designed to ensure that representative data is used for the punning process and that removed rules and facts do not result in significant errors. To ensure representative data and avoid errors related to removal of rules and facts, assessment of both the average error and the identification of large single case changes may be used to improve or maximize the likelihood that the network changes are both generally beneficial and not detrimental to specific cases.

An output network generated by method 600 may be evaluated by a human subject matter expert who would identify internal facts and rule meanings and look for problematic associations, such oversimplifications, stereotypes, biases, or other non-causal associations. The human subject matter expert may then add or add back any missing associations that they identify, or may remove any associations that they identify as problematic, illegal, or non-causal. Once the pruning and human expert review were completed, the final network may be trained for optimization purposes, and the resulting network may then be ready for use. This process makes gradient descent trained exert system learning closer to neural network techniques, while maintaining the known meaning of the rules and facts that are labeled by a human expert, and maintaining defensibility and explainability of the system and its decision-making.

Once the automated initial training and pruning processes are complete, manual review and labeling may be used to provide network defensibility. The initial training and pruning processes may reduce the number of facts used by a network. Some of these facts will be inputs, which are already labeled. Other facts will be intermediary conclusions within the network and not be labeled initially. The number of rules interconnecting the input and intermediate facts may also be reduced. The pruning algorithms described herein improve the network performance, such as by improving the ability of the network to characterize phenomena based on producing target outputs from input values provided. However, these networks may include the oversimplifications, non-causal connections, or other maladies that may be problematic in neural networks. The manual review process may be used to label intermediate facts either as named meaningful values or as functional facts that are used to facilitate grouping of facts between multiple system rules to form larger logical rules. Rules may also be identified as either functional or identified as representing a particular association between data elements. Facts and rules that cannot be identified readily may be investigated further, potentially improving knowledge of the phenomena that is being modeled or to correct the model.

Improved efficiency of some gradient descent trained expert systems may require an a priori known model for the phenomena, or may require or that a known model be created. Neural networks may not require a known network, but may be based on knowledge about characteristics of the phenomena that is being modeled to facilitate parameter selection or parameter improvement (e.g., parameter optimization). The pruning-based gradient descent trained expert system approach may avoid a need for an a priori network knowledge, but is instead based on knowledge of network parameters to determine an appropriate sized network for emulating the network. Both the neural network and pruning-based gradient descent trained expert system may include parameter determination. The pruning-based gradient descent trained expert system may include labeling and review step not typically used in neural networks, but may still result in an improved network, such as when compared to manual network creation.

Both the neural network and pruning-based gradient descent trained expert system may be used to provide the significant benefit of defensibility. In both cases, once an initial network has been developed by a human or automatically developed and human reviewed, the system may not deviate from known-reliable rules and meaningful facts of the expert system during optimization. In both cases, the systems may optimize rule weightings further to provide improved network system performance.

Figure 9:
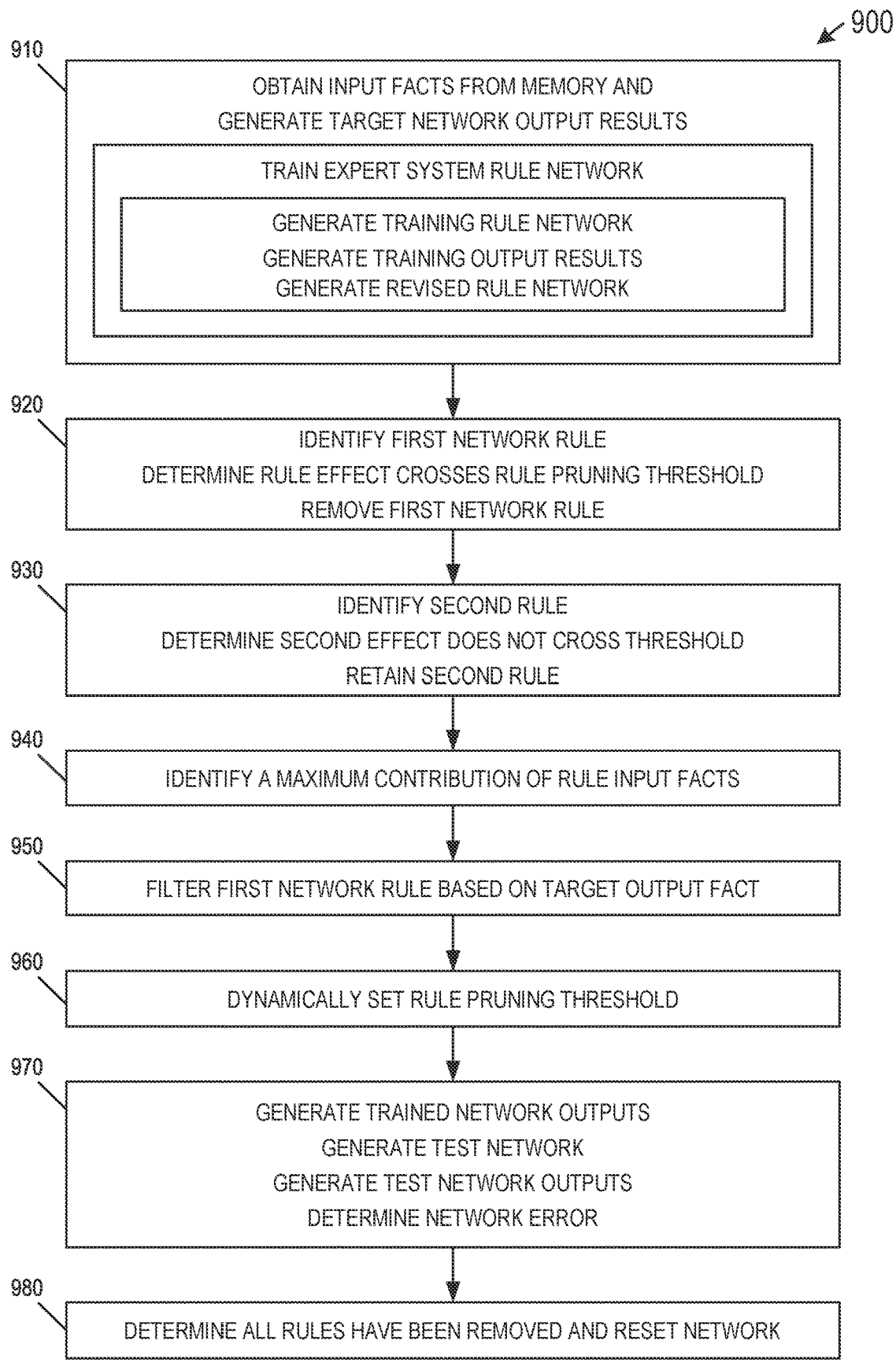
FIG. 9 is a flowchart illustrating a method 900, according to an embodiment.

FIG. 9 is a flowchart illustrating a method 900, according to an embodiment. At 910, method 900 includes obtaining a plurality of input facts from a memory, generating a plurality of target network output results based on the input facts, and training an expert system rule network. The training may include iteratively performing the steps of generating a training rule network, generating a plurality of training output results based on the training rule network and the plurality of input facts, and generating a revised rule network based on a comparison between the plurality of training output results and the plurality of target network output results. The revised rule network may include a plurality of network rules, where each of the plurality of network rules has an associated defensible rule weighting. Each defensible rule weighting may identify a probabilistic mapping of the plurality of input facts to an output fact generated by the expert system rule network.

At 920, method 900 may include identifying a first network rule within the plurality of network rules, determining the rule effect crosses a rule pruning threshold, and removing the first network rule responsive to determining the rule effect crosses the rule pruning threshold. The first network rule may be associated with a rule effect on the expert system rule network. At 930, method 900 may further include identifying a second rule, determining the second effect does not cross the rule pruning threshold, and retaining the second rule responsive to determining the second effect does not cross the rule pruning threshold. The second rule may be associated with a second effect on the expert system rule network.

At 940, method 900 may include identifying a maximum contribution of a plurality of rule input facts, wherein determining the rule effect crosses the rule pruning threshold includes comparing the maximum contribution against a contribution threshold. At 950, method 900 may further include filtering the first network rule based on a target output fact. At 960, method 900 may further include dynamically setting the rule pruning threshold based on the target output fact and the maximum contribution.

At 970, method 900 may further include generating a plurality of trained network outputs based on the expert system rule network, generating a test network by suspending the first network rule within the expert system rule network, generating a plurality of test network outputs by running the test network without the first network rule, and determining a network error based on a difference between the plurality of trained network outputs and the plurality of test network outputs. Determining the rule effect crosses the rule pruning threshold may include determining the network error crosses a network effect threshold. At 980, method 900 may further include determining, responsive to removing the first network rule, that all rules have been removed from the expert system rule network.

Figure 10:
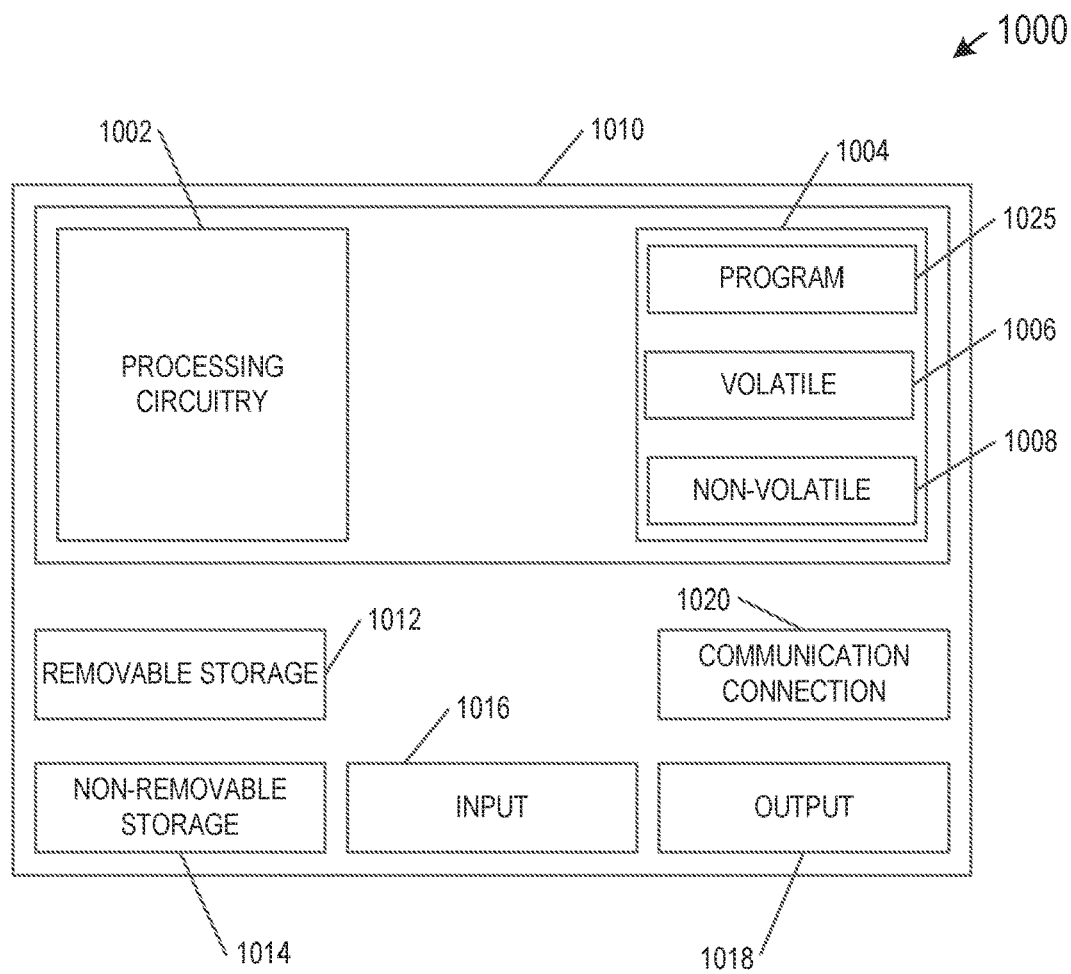
FIG. 10 is a block diagram of a computing device 1000, according to an embodiment.

FIG. 10 is a block diagram of a computing device 1000, according to an embodiment. The performance of computing device 1000 may be improved by including one or more of the systems or methods for training artificial intelligence networks described herein. Computing device 1000 may include processing circuitry 1002 and memory 1004 that include instructions, which when executed by the processing circuitry 1002, configure the processing circuitry 1002 to obtain a plurality of input facts from the memory device, generate a plurality of target network output results based on the input facts, and train an expert system rule network. The training of the expert system rule network may include iteratively performing the steps of generating a training rule network, generating a plurality of training output results based on the training rule network and the plurality of input facts, and generating a revised rule network based on a comparison between the plurality of training output results and the plurality of target network output results. The revised rule network may include a plurality of network rules, each of the plurality of network rules having an associated defensible rule weighting, each defensible rule weighting identifying a probabilistic mapping of the plurality of input facts to an output fact generated by the expert system rule network.

In one embodiment, multiple such computing devices 1000 are used in a distributed network to implement multiple components in a transaction-based environment. An object-oriented, service-oriented, or other architecture may be used to implement such functions and communicate between the multiple systems and components. In some embodiments, the computing device of FIG. 10 is an example of a client device that may invoke methods described herein over a network. In some embodiments, the computing device of FIG. 10 is an example of one or more of the personal computer, smartphone, tablet, or various servers.

One example computing device in the form of a computer 1010, may include processing circuitry 1002, memory 1004, removable storage 1012, and non-removable storage 1014. Although the example computing device is illustrated and described as computer 1010, the computing device may be in different forms in different embodiments. For example, the computing device may instead be a smartphone, a tablet, or other computing device including the same or similar elements as illustrated and described with regard to FIG. 10. Further, although the various data storage elements are illustrated as part of the computer 1010, the storage may include cloud-based storage accessible via a network, such as the Internet.

Returning to the computer 1010, memory 1004 may include volatile memory 1006 and non-volatile memory 1008. Computer 1010 may include or have access to a computing environment that includes a variety of computer-readable media, such as volatile memory 1006 and non-volatile memory 1008, removable storage 1012 and non-removable storage 1014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1010 may include or have access to a computing environment that includes input 1016, output 1018, and a communication connection 1020. The input 1016 may include one or more of a touchscreen, touchpad, mouse, keyboard, camera, and other input devices. The input 1016 may include a navigation sensor input, such as a GNSS receiver, a SOP receiver, an inertial sensor (e.g., accelerometers, gyroscopes), a local ranging sensor (e.g., LIDAR), an optical sensor (e.g., cameras), or other sensors. The computer may operate in a networked environment using a communication connection 1020 to connect to one or more remote computers, such as database servers, web servers, and another computing device. An example remote computer may include a personal computer (PC), server, router, network PC, a peer device or other common network node, or the like. The communication connection 1020 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing circuitry 1002 of the computer 1010. A hard drive (magnetic disk or solid state), CD-ROM, and RAM are some examples of articles including a non-transitory computer-readable medium. For example, various computer programs 1025 or apps, such as one or more applications and modules implementing one or more of the methods illustrated and described herein or an app or application that executes on a mobile device or is accessible via a web browser, may be stored on a non-transitory computer-readable medium.

The apparatuses and methods described above may include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

In the detailed description and the claims, the term "on" used with respect to two or more elements (e.g., materials), one "on" the other, means at least some contact between the elements (e.g., between the materials). The term "over" means the elements (e.g., materials) are in close proximity, but possibly with one or more additional intervening elements (e.g., materials) such that contact is possible but not required. Neither "on" nor "over" implies any directionality as used herein unless stated as such.

In the detailed description and the claims, a list of items joined by the term "at least one of" may mean any combination of the listed items. For example, if items A and B are listed, then the phrase "at least one of A and B" means A only; B only; or A and B. In another example, if items A, B, and C are listed, then the phrase "at least one of A, B and C" means A only; B only; C only; A and B (excluding C); A and C (excluding B); B and C (excluding A); or all of A, B, and C. Item A may include a single element or multiple elements, Item B may include a single element or multiple elements. Item C may include a single element or multiple elements.

In the detailed description and the claims, a list of items joined by the term "one of" may mean only one of the list items. For example, if items A and B are listed, then the phrase "one of A and B" means A only (excluding B), or B only (excluding A). In another example, if items A, B, and C are listed, then the phrase "one of A, B and C" means A only; B only; or C only. Item A may include a single element or multiple elements. Item B may include a single element or multiple elements. Item C may include a single element or multiple elements.

ADDITIONAL NOTES AND EXAMPLES

Example 1 is a system for defensible artificial intelligence networks, the system comprising: processing circuitry; and one or more memory devices including instructions, which when executed by the processing circuitry, configure the processing circuitry to: obtain a plurality of input facts from the one or more memory devices; obtain a plurality of target network output results; and train an expert system rule network by iteratively performing a plurality of steps of: generating a training rule network; generating a plurality of training output results based on the training rule network and the plurality of input facts; and generating a revised rule network based on a comparison between the plurality of training output results and the plurality of target network output results; wherein the revised rule network includes, a plurality of network rules, each of the plurality of network rules having a plurality of associated fact weightings, each weighting identifying a mapping of the plurality of input facts to an output fact.

In Example 2, the subject matter of Example 1 includes, wherein the plurality of associated fact weightings indicates a human-readable weighting to provide a defensibility of the expert system rule network.

In Example 3, the subject matter of Examples 1-2 includes, a sensor for generating the plurality of input facts, wherein the processing circuitry is further to store the plurality of input facts into the one or more memory devices.

In Example 4, the subject matter of Examples 1-3 includes, wherein the plurality of target network output results is generated based on the plurality of input facts.

In Example 5, the subject matter of Examples 1-4 includes, the instructions further configuring the processing circuitry to: identify a first network rule within the plurality of network rules, the first network rule associated with a rule effect on the expert system rule network; determine the rule effect crosses a rule pruning threshold; and remove the first network rule responsive to determining the rule effect crosses the rule pruning threshold.

In Example 6, the subject matter of Example 5 includes, the instructions further configuring the processing circuitry to: identify a second rule, the second rule associated with a second effect on the expert system rule network; determine the second effect does not cross the rule pruning threshold; and retain the second rule responsive to determining the second effect does not cross the rule pruning threshold.

In Example 7, the subject matter of Examples 5-6 includes, the instructions further configuring the processing circuitry to identify a maximum contribution of a plurality of rule input facts, wherein determining the rule effect crosses the rule pruning threshold includes comparing the maximum contribution against a contribution threshold.

In Example 8, the subject matter of Example 7 includes, the instructions further configuring the processing circuitry to filter the first network rule based on a target output fact.

In Example 9, the subject matter of Example 8 includes, the instructions further configuring the processing circuitry to dynamically set the rule pruning threshold based on the target output fact and the maximum contribution.

In Example 10, the subject matter of Examples 5-9 includes, the instructions further configuring the processing circuitry to: generate a plurality of trained network outputs based on the expert system rule network; generate a test network by suspending the first network rule within the expert system rule network; generate a plurality of test network outputs by running the test network without the first network rule; and determine a network error based on a difference between the plurality of trained network outputs and the plurality of test network outputs; wherein determining the rule effect crosses the rule pruning threshold includes determining the network error crosses a network effect threshold.

In Example 11, the subject matter of Example 10 includes, the instructions further configuring the processing circuitry to determine, responsive to removing the first network rule, that all rules have been removed from the expert system rule network.

In Example 12, the subject matter of Example 11 includes, the instructions further configuring the processing circuitry to: determine a rule filter is not enabled; and restore the expert system rule network.

In Example 13, the subject matter of Examples 11-12 includes, the instructions further configuring the processing circuitry to: determine a rule filter is enabled; and generate a failure indication associated with the expert system rule network.

Example 14 is a method for defensible artificial intelligence networks, the method comprising: obtaining a plurality of input facts from one or more memory devices; obtain a plurality of target network output results, and training an expert system rule network by iteratively performing a plurality of steps of: generating a training rule network; generating a plurality of training output results based on the training rule network and the plurality of input facts; and generating a revised rule network based on a comparison between the plurality of training output results and the plurality of target network output results; wherein the revised rule network includes, a plurality of network rules, each of the plurality of network rules having a plurality of associated fact weightings, each weighting identifying a mapping of the plurality of input facts to an output fact.

In Example 15, the subject matter of Example 14 includes, wherein the plurality of associated fact weightings indicates a human-readable weighting to provide a defensibility of the expert system rule network.

In Example 16, the subject matter of Examples 14-15 includes, wherein: the plurality of input facts is generated by a sensor; and the plurality of input facts is stored in the one or more memory devices.

In Example 17, the subject matter of Examples 14-16 includes, wherein the plurality of target network output results is generated based on the plurality of input facts.

In Example 18, the subject matter of Examples 14-17 includes, identifying a first network rule within the plurality of network rules, the first network rule associated with a rule effect on the expert system rule network; determining the rule effect crosses a rule pruning threshold; and removing the first network rule responsive to determining the rule effect crosses the rule pruning threshold.

In Example 19, the subject matter of Example 18 includes, identifying a second rule, the second rule associated with a second effect on the expert system rule network; determining the second effect does not cross the rule pruning threshold; and retaining the second rule responsive to determining the second effect does not cross the rule pruning threshold.

In Example 20, the subject matter of Examples 18-19 includes, identifying a maximum contribution of a plurality of rule input facts, wherein determining the rule effect crosses the rule pruning threshold includes comparing the maximum contribution against a contribution threshold.

In Example 21, the subject matter of Example 20 includes, filtering the first network rule based on a target output fact.

In Example 22, the subject matter of Example 21 includes, dynamically setting the rule pruning threshold based on the target output fact and the maximum contribution.

In Example 23, the subject matter of Examples 18-22 includes, generating a plurality of trained network outputs based on the expert system rule network; generating a test network by suspending the first network rule within the expert system rule network; generating a plurality of test network outputs by running the test network without the first network rule; and determining a network error based on a difference between the plurality of trained network outputs and the plurality of test network outputs; wherein determining the rule effect crosses the rule pruning threshold includes determining the network error crosses a network effect threshold.

In Example 24, the subject matter of Example 23 includes, determining, responsive to removing the first network rule, that all rules have been removed from the expert system rule network.

In Example 25, the subject matter of Example 24 includes, determining a rule filter is not enabled; and restoring the expert system rule network.

In Example 26, the subject matter of Examples 24-25 includes, determining a rule filter is enabled; and generating a failure indication associated with the expert system rule network.

Example 27 is a non-transitory machine-readable storage medium, comprising instructions that, responsive to being executed with processing circuitry of a computer-controlled device, cause the processing circuitry to: obtain a plurality of input facts from one or more memory devices; obtain a plurality of target network output results; and train an expert system rule network by iteratively performing a plurality of steps of: generating a training rule network; generating a plurality of training output results based on the training rule network and the plurality of input facts; and generating a revised rule network based on a comparison between the plurality of training output results and the plurality of target network output results; wherein the revised rule network includes, a plurality of network rules, each of the plurality of network rules having a plurality of associated fact weightings, each weighting identifying a mapping of the plurality of input facts to an output fact.

In Example 28, the subject matter of Example 27 includes, wherein the plurality of associated fact weightings indicates a human-readable weighting to provide a defensibility of the expert system rule network.

In Example 29, the subject matter of Examples 27-28 includes, a sensor for generating the plurality of input facts, wherein the processing circuitry is further to store the plurality of input facts into the one or more memory devices.

In Example 30, the subject matter of Examples 27-29 includes, wherein the plurality of target network output results is generated based on the plurality of input facts.

In Example 31, the subject matter of Examples 27-30 includes, the instructions further configuring the processing circuitry to: identify a first network rule within the plurality of network rules, the first network rule associated with a rule effect on the expert system rule network; determine the rule effect crosses a rule pruning threshold; and remove the first network rule responsive to determining the rule effect crosses the rule pruning threshold.

In Example 32, the subject matter of Example 31 includes, the instructions further configuring the processing circuitry to: identify a second rule, the second rule associated with a second effect on the expert system rule network; determine the second effect does not cross the rule pruning threshold; and retain the second rule responsive to determining the second effect does not cross the rule pruning threshold.

In Example 33, the subject matter of Examples 31-32 includes, the instructions further configuring the processing circuitry to identify a maximum contribution of a plurality of rule input facts, wherein determining the rule effect crosses the rule pruning threshold includes comparing the maximum contribution against a contribution threshold.

In Example 34, the subject matter of Example 33 includes, the instructions further configuring the processing circuitry to filter the first network rule based on a target output fact.

In Example 35, the subject matter of Example 34 includes, the instructions further configuring the processing circuitry to dynamically set the rule pruning threshold based on the target output fact and the maximum contribution.

In Example 36, the subject matter of Examples 31-35 includes, the instructions further configuring the processing circuitry to: generate a plurality of trained network outputs based on the expert system rule network; generate a test network by suspending the first network rule within the expert system rule network; generate a plurality of test network outputs by running the test network without the first network rule; and determine a network error based on a difference between the plurality of trained network outputs and the plurality of test network outputs; wherein determining the rule effect crosses the rule pruning threshold includes determining the network error crosses a network effect threshold.

In Example 37, the subject matter of Example 36 includes, the instructions further configuring the processing circuitry to determine, responsive to removing the first network rule, that all rules have been removed from the expert system rule network.

In Example 38, the subject matter of Example 37 includes, the instructions further configuring the processing circuitry to: determine a rule filter is not enabled; and restore the expert system rule network.

In Example 39, the subject matter of Examples 37-38 includes, the instructions further configuring the processing circuitry to: determine a rule filter is enabled; and Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

The subject matter of any Examples above may be combined in any combination.

The above description and the drawings illustrate some embodiments of the inventive subject matter to enable those skilled in the art to practice the embodiments of the inventive subject matter. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. A system for defensible artificial intelligence networks, the system comprising:
   processing circuitry; and
   one or more memory devices including instructions, which when executed by the processing circuitry, configure the processing circuitry to:
   obtain a plurality of input facts from the one or more memory devices;
   obtain a plurality of target network output results; and
   train an expert system rule network by iteratively performing a plurality of steps of:
   generating a training rule network;
   generating a plurality of training output results based on the training rule network and the plurality of input facts;
   generating a revised rule network based on a comparison between the plurality of training output results and the plurality of target network output results, the revised rule network including a plurality of network rules, each of the plurality of network rules having a plurality of associated fact weightings, each weighting identifying a mapping of the plurality of input facts to an output fact;
   identifying a first network rule within the plurality of network rules, the first network rule associated with a rule effect on the expert system rule network;
   determining the rule effect crosses a rule pruning threshold;
   removing the first network rule responsive to determining the rule effect crosses the rule pruning threshold;
   generating a plurality of trained network outputs based on the expert system rule network;
   generating a test network by suspending the first network rule within the expert system rule network;
   generating a plurality of test network outputs by running the test network without the first network rule;
   determining a performance metric based on a comparison between the plurality of trained network outputs and the plurality of test network outputs, wherein determining the rule effect crosses the rule pruning threshold includes determining the performance metric satisfies a network performance threshold; and
   determining, responsive to removing the first network rule, that all rules have been removed from the expert system rule network.

2. The system of claim 1, wherein the plurality of associated fact weightings indicates a human-readable weighting to provide a defensibility of the expert system rule network.

3. The system of claim 1, further including a sensor for generating the plurality of input facts, wherein the processing circuitry is further to store the plurality of input facts into the one or more memory devices.

4. The system of claim 1, the instructions further configuring the processing circuitry to:
   identify a second rule, the second rule associated with a second effect on the expert system rule network;
   determine the second effect does not cross the rule pruning threshold; and
   retain the second rule responsive to determining the second effect does not cross the rule pruning threshold.

5. The system of claim 1, the instructions further configuring the processing circuitry to identify a maximum contribution of a plurality of rule input facts, wherein determining the rule effect crosses the rule pruning threshold includes comparing the maximum contribution against a contribution threshold.

6. The system of claim 5, the instructions further configuring the processing circuitry to filter the first network rule based on a target output fact.

7. The system of claim 6, the instructions further configuring the processing circuitry to dynamically set the rule pruning threshold based on the target output fact and the maximum contribution.

8. A method for defensible artificial intelligence networks, the method comprising:
   obtaining a plurality of input facts from one or more memory devices;
   obtain a plurality of target network output results; and
   training an expert system rule network by iteratively performing a plurality of steps of:
   generating a training rule network;
   generating a plurality of training output results based on the training rule network and the plurality of input facts;
   generating a revised rule network based on a comparison between the plurality of training output results and the plurality of target network output results, the revised rule network including a plurality of network rules, each of the plurality of network rules having a plurality of associated fact weightings, each weighting identifying a mapping of the plurality of input facts to an output fact;

identifying a first network rule within the plurality of network rules, the first network rule associated with a rule effect on the expert system rule network;

determining the rule effect crosses a rule pruning threshold;

removing the first network rule responsive to determining the rule effect crosses the rule pruning threshold;

generating a plurality of trained network outputs based on the expert system rule network;

generating a test network by suspending the first network rule within the expert system rule network:

generating a plurality of test network outputs by running the test network without the first network rule;

determining a performance metric based on a comparison between the plurality of trained network outputs and the plurality of test network outputs, wherein determining the rule effect crosses the rule pruning threshold includes determining the performance metric satisfies a network performance threshold; and determining, responsive to removing the first network rule, that all rules have been removed from the expert system rule network.

9. The method of claim 8, wherein the plurality of associated fact weightings indicates a human-readable weighting to provide a defensibility of the expert system rule network.

10. The method of claim 8, further including:
identifying a second rule, the second rule associated with a second effect on the expert system rule network;
determining the second effect does not cross the rule pruning threshold; and
retaining the second rule responsive to determining the second effect does not cross the rule pruning threshold.

11. The method of claim 8, further including identifying a maximum contribution of a plurality of rule input facts, wherein determining the rule effect crosses the rule pruning threshold includes comparing the maximum contribution against a contribution threshold.

12. The method of claim 11, further including filtering the first network rule based on a target output fact.

13. The method of claim 12, further including dynamically setting the rule pruning threshold based on the target output fact and the maximum contribution.

14. A non-transitory machine-readable storage medium, comprising instructions that, responsive to being executed with processing circuitry of a computer-controlled device, cause the processing circuitry to:

obtain a plurality of input facts from one or more memory devices;

obtain a plurality of target network output results; and train an expert system rule network by iteratively performing a plurality of steps of:
generating a training rule network;
generating a plurality of training output results based on the training rule network and the plurality of input facts;
generating a revised rule network based on a comparison between the plurality of training output results and the plurality of target network output results, the revised rule network including a plurality of network rules, each of the plurality of network rules having a plurality of associated fact weightings, each weighting identifying a mapping of the plurality of input facts to an output fact;
identifying a first network rule within the plurality of network rules, the first network rule associated with a rule effect on the expert system rule network;
determining the rule effect crosses a rule pruning threshold:
removing the first network rule responsive to determining the rule effect crosses the rule pruning threshold;
generating a plurality of trained network outputs based on the expert system rule network;
generating a test network by suspending the first network rule within the expert system rule network;
generating a plurality of test network outputs by running the test network without the first network rule;
determining a performance metric based on a comparison between the plurality of trained network outputs and the plurality of test network outputs, wherein determining the rule effect crosses the rule pruning threshold includes determining the performance metric satisfies a network performance threshold; and
determining, responsive to removing the first network rule, that all rules have been removed from the expert system rule network.

* * * * *